US008624720B2

(12) United States Patent
Bajpay et al.

(10) Patent No.: US 8,624,720 B2
(45) **Date of Patent: *Jan. 7, 2014**

(54) SECURITY INFRASTRUCTURE

(75) Inventors: Paritosh Bajpay, Edison, NJ (US); Roberta Bienfait, Norcross, GA (US); Ginny Cast, Conyers, GA (US); Wan-Ping Chiang, Colts Neck, NJ (US); Kim Hanechak, Covington, GA (US); Jackson Liu, Middletown, NJ (US); Denise Stokes, Atlanta, GA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1046 days.

This patent is subject to a terminal disclaimer.

(21) Appl. No.: 12/647,465

(22) Filed: Dec. 26, 2009

(65) Prior Publication Data

US 2010/0097213 A1 Apr. 22, 2010

Related U.S. Application Data

(63) Continuation of application No. 11/312,402, filed on Dec. 21, 2005, now Pat. No. 7,663,479.

(51) Int. Cl.
*G08B 29/00* (2006.01)
*G06F 11/00* (2006.01)

(52) U.S. Cl.
USPC ........... 340/506; 340/517; 340/531; 340/521; 726/22; 726/23

(58) Field of Classification Search
USPC ........................................................ 340/506
See application file for complete search history.

(56) References Cited

U.S. PATENT DOCUMENTS

| | | | | |
|---|---|---|---|---|
| 5,295,244 | A | 3/1994 | Dev et al. | |
| 5,896,440 | A | 4/1999 | Reed et al. | |
| 6,147,601 | A | 11/2000 | Sandelman et al. | |
| 6,369,705 | B1 | 4/2002 | Kennedy | |
| 6,400,265 | B1 | 6/2002 | Saylor et al. | |
| 6,617,969 | B2 | 9/2003 | Tu et al. | |
| 7,068,189 | B2 | 6/2006 | Brescia | |
| 7,159,237 | B2 | 1/2007 | Schneier et al. | |
| 7,509,677 | B2 | 3/2009 | Saurabh et al. | |
| 7,663,479 | B1 * | 2/2010 | Bajpay et al. | 340/506 |
| 2002/0050926 | A1 | 5/2002 | Lewis et al. | |

* cited by examiner

*Primary Examiner* — Donnie Crosland

(57) ABSTRACT

An automated security infrastructure is disclosed that includes security agents that are designed to analyze security issues. The security agents process events received from event-messages, and records data associated with a security issue in a ticket. Security and management personnel are kept informed based on notification subscription lists. Assigned security personnel's progress in resolving outstanding security issues is monitored until those issues are resolved.

20 Claims, 14 Drawing Sheets

160

164

162

| | Security Agent 1 | Security Agent 2 | .... | Event-Message Subscriber i | Event-Message Subscriber i+1 | .... | Event-Message Subscriber m |
|---|---|---|---|---|---|---|---|
| Event-Database 1 | o | | | 321-123-0987 | | | BigBoss@att.com |
| Event-Database 2 | | o | | | Sherlock@yahoo.com | | 987-432765.page.com |
| Event-Database 3 | o | o | | 987-432765.page.com | 654-156-7890 | | |
| .... .... | | | | | | | |
| Event-Database n | | o | | | | | |

Fig. 4

460

| NAME | CRITERIA | EMAIL | PAGER | ••• |
|---|---|---|---|---|
| JOHN DOE | STATUS=NEW, CLOSE; PRIORTITY=1,2,3 | Jd@yahoo.com | 9998887777@page.abc.com | ••• |
| MARY SMITH | STATUS=NEW; PRIORTITY=1,2; LOCATION=*NJ* | Js@yahoo.com | 7776665555@page.abc.com | ••• |
| ••• | | | | |

462 464 466

Fig. 13

SECURITY INFRASTRUCTURE

This application is a continuation of U.S. patent application Ser. No. 11/312,402, filed Dec. 21, 2005, now U.S. Pat. No. 7,663,479 B1, which is herein incorporated by reference in its entirety.

BACKGROUND

Security infrastructures are invaluable in providing protection against illicit accesses or damage to important information and physical property. Thus, new technology is needed to improve security infrastructures.

SUMMARY

An automated security infrastructure is disclosed that includes security agents that are designed to analyze particular security issues such as an attack on secured property and/or computer systems. The security agents receive events from monitor systems (e.g., intrusion detection system, premise security system, etc.) that perform monitoring functions such as detecting intrusion on property; seeking out, correlating and analyzing context information related to the events; and recording all information associated with a security issue in a ticket which persists in the security infrastructure at least until the security issue is resolved, for example. Events may be in the form of messages generated by the monitor systems that contain information associated with detected incidences. The security agents keep security and management personnel informed and monitor assigned security personnel's progress in resolving outstanding security issues until those issues are resolved.

The security infrastructure may be event driven and include an event-message formatter that formats events generated by the monitor systems so that information contained in the events is readily accessible to security agents and human personnel. Data formats of events may vary depending on manufacturers of the monitor systems. Thus, converting events of differing forms into a standardized common format avoids repeated conversions by individual security agents or personnel and avoids delay in information analysis within the security infrastructure. In the case of security personnel, differing formats introduces human error which leads to more careful, thus time consuming, examination of events at best and not addressing events due to inconvenience of information extraction, at worst. Therefore, standardizing event-message formats facilitates security agents and/or human personnel decisions to be made based on the most current detection data generated by the monitor systems.

The security infrastructure includes an event-message distributor that distributes event-messages to security agents or personnel which are event-message consumers. Event-message consumers may subscribe to particular types of events in the monitor system. The event-message distributor actively distributes event-messages as the corresponding events are generated by the monitor system. Thus, event-message consumers may not be burdened with monitoring whether an event of interest has occurred. Therefore, the event-message distributor permits event-message consumers to be distributed over large geographical areas but receive event-messages as if directly connected to the desired monitor systems. In this way, each of the event-message consumers may perform its assigned tasks without having to monitor whether subscribed-to events have been generated.

Additionally, security agents may also generate event-messages that are distributed by the event-message distributor.

Thus, the event-message distributor may serve as a communication path for security agents so that each security agent may operate completely independently. The event-message formatter and distributor create an environment within the security infrastructure that enables every event-message consumer to timely receive the most current subscribed-to event-messages.

In a particular implementation, a security agent may be an artificial intelligent program using inference engines to process data based on rules, for example. Security agents may be designed by security personnel that focus on particular security issues such as building/room accesses, attacks such as virus, worm or denial-of-service, etc. Many security agents may be used and the security agents may be organized hierarchically so that lower level security agents may process lower level security issues such as monitor illicit accesses to a particular physical space while higher level security agents may process higher level security issues such as an organized attack on a building that may include illicit accesses in multiple physical areas as well as illicit cyber access attacks such as multiple access attempts to secured servers, for example.

When an event-message is received, a security agent first determines if the event-message is caused by legitimate activity. If not, the security agent may determine whether a possible security breach has occurred by collecting additional event-messages that may be generated around the same time and same location/source. For example, if the first event-message indicates an illegal entry through a door, then event-messages from one or more nearby doors may provide helpful information in analyzing a possible security breach. Security agents may also analyze lower level subtle and long term attacks that is perpetrated by a collection of illicit activity dribbled over an extended period of time.

Security agents may store information related to a security issue in a ticket data structure (ticket). Tickets provide a tracking system of security issues and are processed and maintained by a ticketing system. For example, information collected by security agents may be stored by adding information to an existing ticket (updating a ticket) or cause a new ticket to be created (opening a ticket). Each ticket may be associated with a security agent that caused it to be opened and processes the ticket until the associated security issue is resolved. When the related security issue is resolved, the ticket may be closed.

When a ticket is opened, updated or closed, the associated security agent may ensure that notification is sent to one or more appropriate personnel. For example, if a newly opened ticket is assigned to a specific security person (or a group), the associated security agent may send a notice to the security person and tracks whether the notice was picked-up. If not picked-up within a preset time, appropriate management personnel may be alerted to call attention to the situation. This may continue until the related security issue is resolved and the corresponding ticket is closed.

In view of the above, the security infrastructure provides an efficient automated environment for analyzing security issues and an accountable environment for security personnel. In this way, decisions based on inaccurate data and delay caused by human errors may be minimized, providing greater security infrastructure effectiveness.

BRIEF DESCRIPTION OF THE DRAWINGS

FIG. 4 shows an exemplary event-message subscriber list;

FIG. 13 shows an exemplary subscription list related to tickets; and

DETAILED DESCRIPTION OF EMBODIMENTS

Figure 1:
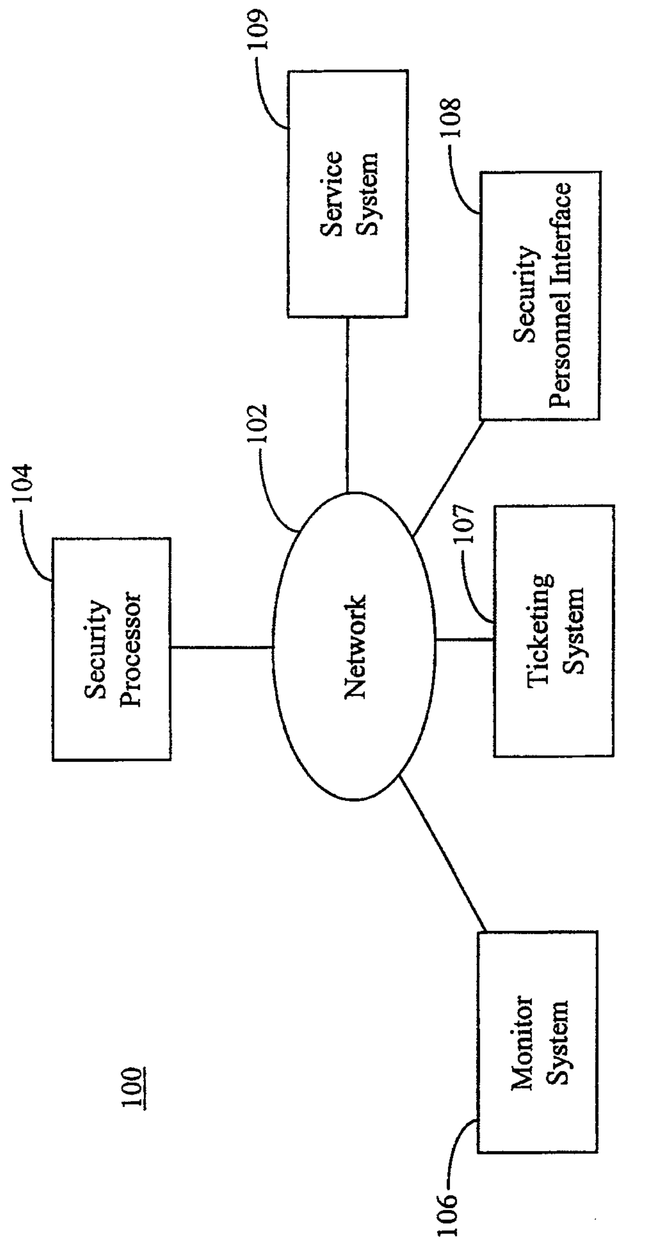
FIG. 1 shows an exemplary diagram of a security infrastructure.

FIG. 1 shows an exemplary diagram of a security infrastructure 100 that includes a network 102 that interconnects a security processor 104, monitor system 106, a ticketing system 107, a security personnel interface 108 and service system 109. Network 102 may comprise one or more networks of any type such as a local area network (LAN), a wide area network (WAN), the Internet, etc. implemented using technology such as wired, wireless, optical, etc. Monitor system 106 (e.g., physical security management system, network maintenance system, intrusion detection system, etc.) may include physical detection devices such as door access detectors, temperature sensors, motion detectors, light sensors, cable continuity detectors, etc., as well as non-physical event-messages that detect excessive number of packets of a particular destination address, inappropriate access attempts using invalid passwords, etc. Monitor system 106 provides raw information in the form of events that is processed by security processor 104. Events are messages generated by monitor system 106 that contain detection data.

Ticket system 107 manages tickets created and updated by security processor 104 and security personnel via security personnel interface 108. Service system 109 (e.g., corporate Human Resource system, work scheduling system, network or server configuration database, network control system) provides services for accessing context (e.g., valid human resource identification (HRID), maintenance work on certain location, etc.) and performing containment actions (e.g., deny door entrance, deny server access).

For example, when an illicit access to a critical room/building is requested by a person using an access-badge (a requesting access-badge), monitor system 106 may generate an event in the form of an access-message and forward the access-message through network 102 to security processor 104. Security processor 104 may first check whether the requested access is valid in the most up-to-date database in service system 109. If the requesting access-badge code is found in the list, then access may be granted. However, if the requesting access-badge code is not found in the list, then security processor 104 may open a ticket in ticketing system 107 to collect related information and inform security personnel via security personnel interface 108.

A ticket is an object of ticketing system 107 that keeps track of one or more security events (a breach or attempted breach of security infrastructure 100) that has occurred over a specified period of time, such as days, weeks, months or years, for example. The period of time may be set to any value depending on a particular related security issue, and also may be adaptively set based on circumstances. When a ticket is opened, a ticket identification may be assigned and the ticket remains active until the circumstances associated with the ticket is satisfactorily resolved, in which case the ticket is closed.

A ticket is not discarded even when closed, but is maintained in a database for future analysis. For example, low-level security breaches that may dribble out over an extended period of time may be detected by correlating information stored in many tickets that may span over months. While each of the tickets may be apparently resolved, patterns may be detected by analyzing ticket history and associated circumstances.

As noted above, tickets are opened when monitor system 106 detects a event such as repeated attempts to access a door with an invalid access-badge or attempts to access a server using an invalid password, for example. When the same access-attempt occurs again within certain timeframe (e.g., 1 minute), the subsequent event is logged in the same ticket that was previously opened, so that a history may be recorded together with other circumstance that may be collected by security processor 104. In this way, analysis of tickets may examine similarities of circumstances as well as patterns relating to what, where, when, why, how, etc. questions.

Security processor 104 may also maintain communication with security personnel and/or other personnel that has a need to know. For example, when a ticket is opened, one or more appropriate security personnel may be informed. Additionally, timers may be activated when action by security personnel is expected. If the expected action is not taken, security processor 104 may escalate the ticket to higher-level management so that human error may be controlled. Thus, security processor 104 is an integration point for security event consolidation, filtering and coordination.

Figure 2:
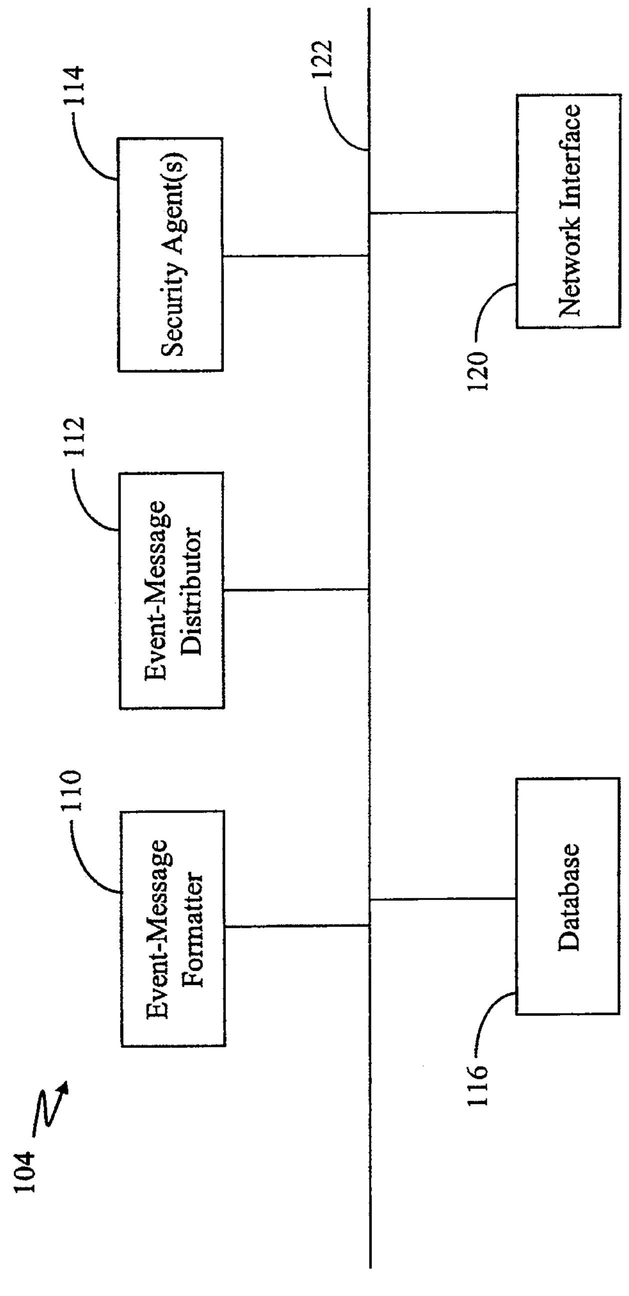
FIG. 2 shows an exemplary block diagram of a security processor.

FIG. 2 shows an exemplary block diagram of security processor 104 that may include event-message formatter 110, event-message distributor 112, one or more security agents 114, database 116 and network interface 120 all coupled together via bus 122. While FIG. 2 shows the above components in a hardware bus architecture format, other architectures may be use such as distributed architecture, or, for example, these components may be constructed using FPGAs, PLAs, application specific integrated circuits (ASICs), etc. that are configured as desired. Security processor 104 may include one or more general or special computers such as personal computers, servers, mainframes, etc. executing software components such as programs that perform some or all of security processor functions.

Event-message formatter 110 formats one or more events received from monitor system 106. When an event is received from monitor system 106, the event-message formatter 110 converts the received event into a common format for distribution by event-message distributor 112 to subscribing entities of security infrastructure 100. Monitor system 106 may include diverse hardware and software units that perform many different types of event detections. Door access controllers, motion detectors, firewalls, denial-of-service (DOS) attack detection systems, etc., may all make detections and generate events that include information specific to a particular unit, and thus, may have differing formats. Where necessary, event-message formatter 110 converts all events received by security processor 104 into a standard event-message format that may be accessed and processed by any component within security processor 104. Events that are already formatted in the standard event-message format may bypass event-message formatter 110 and may be directly provided to event-message distributor 112 for storage and distribution within security infrastructure 100.

Figure 3:
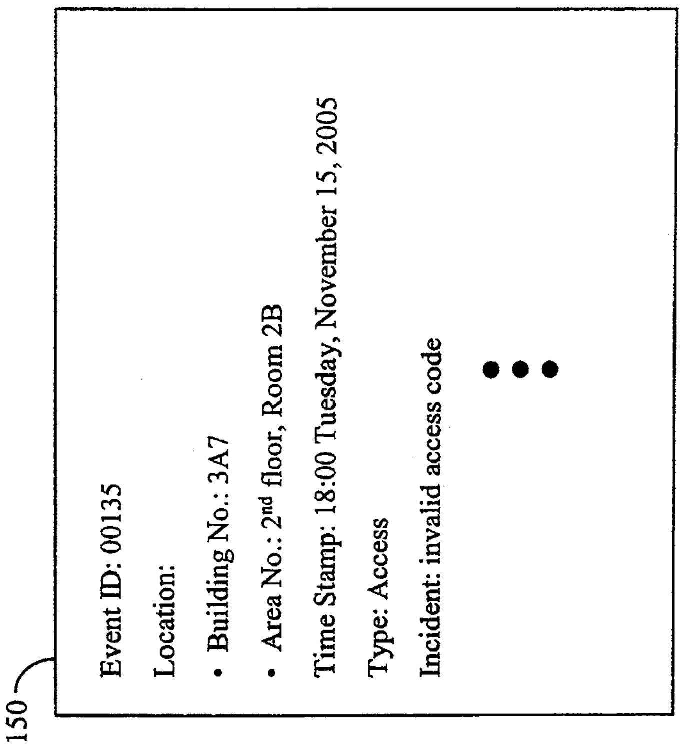
FIG. 3 shows an exemplary event-message.

FIG. 3 shows an exemplary event-message 150 that includes an event identification (ID), location of the event, time stamp indicating a time that is associated with the event (time of detection), an event type, a description of the event, etc. The event ID may be assigned by event-message formatter 110, event-message distributor 112, or some other component of security infrastructure 100 to uniquely identify each event. The location may be any physical location information such as building, area, and room number, as shown in FIG. 3. Other "location" identification may also be used such as server identification where the detected event occurred, a particular network link identification, a source of a connection, a global positioning system (GPS) coordinate and/or any other types of location identification that may be deemed appropriate. Location and time information may be important for later event analysis because other events occurring around closely related locations and around the time of the event may be critical to determining characteristics of the event, a level of seriousness, possible damage, containment actions, etc.

Once event-message formatter 11 a generates an event-message, event-message distributor 112 may store the event-message in database 116 which may be a facility for storing event-messages thus providing for event-message persistency. The event-messages may be stored in groups where related event-messages may be stored as event-databases where each group may be identified by a name and referenced by that name. In a particular implementation, the grouping criteria may be based on topics or event-message contents. Database 116 may be implemented using memories (hard disks, optical disks, RAM, etc.) distributed logically and/or physically throughout security infrastructure 100. Event-message distributor 112 distributes event-messages to subscribers such as security agents, security personnel and/or management personnel, for example. Thus, event-message distributor 112 may act as a source of event-messages to subscribers such as security agents 114 and actively distributes event-messages to subscribers without any action by the subscribers. Otherwise, subscribers would be burdened with a large task of monitoring for desired event-messages. For example, security infrastructure 100 may comprise many platforms (e.g., servers, mainframes, personal computers, etc.) and a particular event-message subscriber may not know where the event-message of interest is generated. Therefore, event-message distributor 112 makes transparent event-message collection and distribution processes so that event-message subscribers may focus on their assigned security issue resolution tasks.

Event-message distributor 112 may maintain a configuration of security infrastructure 100 via a registration process, for example, so that appropriate event-message subscribers may receive subscribed-to event-messages when a relevant event occurs. An event-message subscriber may register with event-message distributor 112 by sending a registration message indicating a subscriber ID, one or more subscribed-to event-databases and desired event-message filtering criteria. The event-message filtering criteria may specify detailed subscriptions of specific event-messages within each event-database, for example. This registration information may be changed as circumstances change so that event-message distributor 112 may ensure that event-messages may be distributed to appropriate event-message subscribers in a timely manner.

FIG. 4 shows an exemplary event-message subscriber list 160 in the form of a table. Rows 162 correspond to event-databases that are deployed in security processor 104 and columns 164 correspond to the subscribers that have registered for receiving event-messages stored in the event-databases. Addresses of subscribing subscribers may be entered at the row-column intersections, or if only one address is used, then the intersections may only be an indicator of the subscription. For example, security agent 1 may subscribe to security databases 1 and 3, while security agent 2 may subscribe to security database 2, 3, and n.

Figure 5:
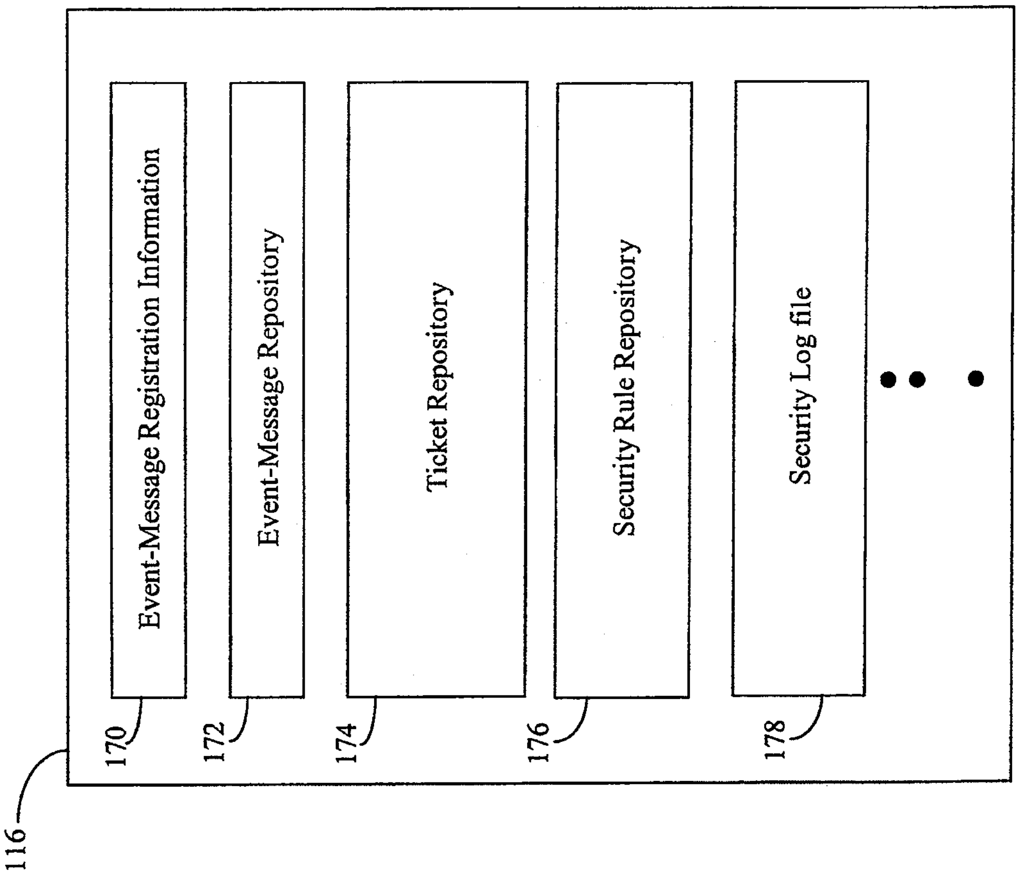
FIG. 5 shows an exemplary block diagram of a security database.

Database 116 stores information in security processor 104 for its operation. While shown as a single object in FIG. 2, as indicated above, database 116 may be distributed in various platforms as specific implementations may require. FIG. 5 shows that database 116 may include information such as event-message registration information 170, event-message repository 172, ticket repository 174, security rule 176 and security log file 178 associated with security agents 114 discussed below, etc. Event-message repository 172 may store event-messages organized in groups as the event-databases noted above. Event-message registration information 170 may include information such as identification and locations (physical, logical or other designations) of all event-databases, event-messages, addresses of event-message subscribers, event-message subscriptions such as the exemplary event-message subscriber list 160 shown in FIG. 5, and other similar or related types of information Event-message repository 172 may include all event-messages generated within security processor 104 that are still alive (i.e., not deleted). The life span of each event-message may be managed by a security agent 114, for example. As noted above, while a particular event-message may be erased, an associated ticket that has incorporated the erased event-message and analysis results or historical record related to that event-message may continue to persist in security processor 104. Thus, if needed, an event-message may be kept alive for as long as required to resolve any security issues.

Ticket repository 174 stores all opened and closed tickets until erased. As noted above, tickets may be saved for multiple years depending on security issue analysis requirements. As with event-messages, their life span from "opened" to "closed" are managed by the security agent 114 that opened the ticket.

Figure 6:
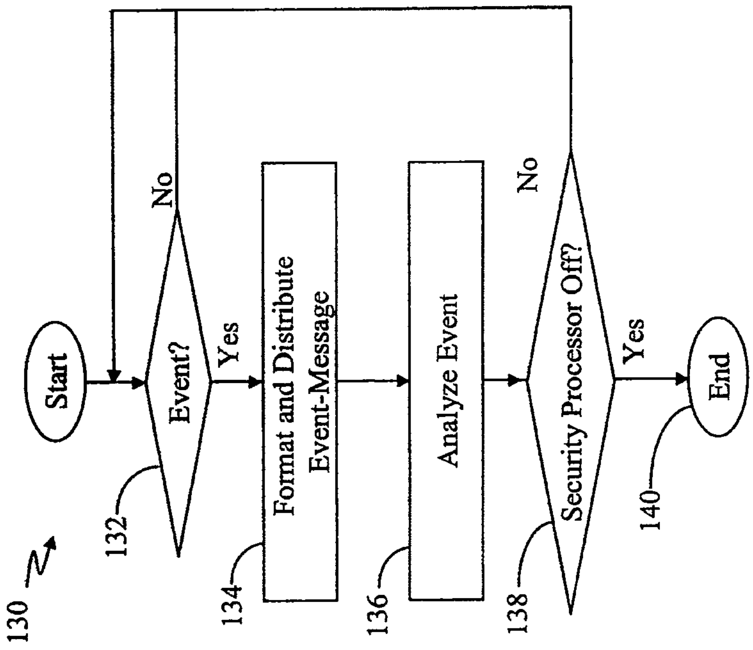
FIG. 6 shows a flowchart of an exemplary process of the security processor.

FIG. 6 shows a flowchart 130 of an exemplary process of security processor 104. In step 13 2, the process determines whether an event has been received from monitor system 106. If an event has been received, the process goes to step 134; otherwise, the process returns to step 132. In step 134, the process formats the received event into an event-message and distributes the event-message to event-message subscribers such as security agents 114 or security personnel, and the process goes to step 136. In step 136, security agents 114 analyze the event corresponding to the event-message, and the process goes to step 138. In step 138, the process determines if security processor 104 is to be turned off or otherwise rendered inoperative. If security processor 104 is to be turned off, the process goes to step 140 and ends; otherwise, the process returns to step 132.

Security agents 114 may perform the functions of step 136 shown in FIG. 6 using inference engines and rules to handle every security event-message. Security agents 114 may be organized in an hierarchical manner where higher level security agents 114 handle more global patterns based on subscribed event-messages generated by lower level security agents 114 that are designed to monitor specific patterns of events occurring in security processor 104.

Each security agent 114 may be associated with a security rule set stored in security rule repository 176. Security rules define methods and procedures that are needed for security agents 114 to perform monitoring and analysis functions. For example, security rules may define dribble attack patterns. Security agents 114 may register with event-message distributor 112 to subscribe to the relevant event-databases with appropriate filters so that when an event-message corresponding to selected event-database is generated, subscribing security agents 114 may be alerted. When one or more event-messages are received, security agents 114 may process the event-messages based on information in the associated event-messages; request service system 109 for additional information, create or update a ticket, take containment actions and alerting security and/or management personnel, for example. While FIG. 5 shows security rule repository 176 as a single item in database 116, they may be distributed on many different platforms interconnected by network 102, for example.

Figure 7:
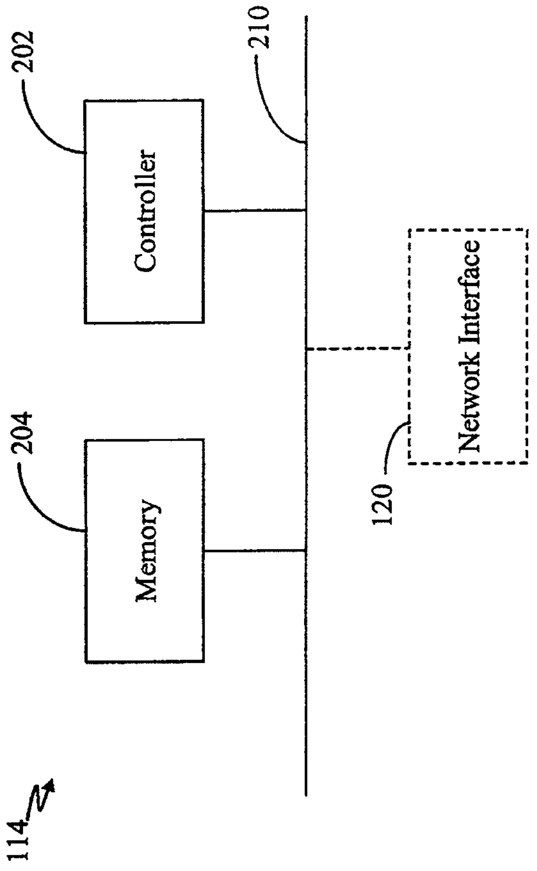
FIG. 7 shows an exemplary block diagram of a security agent.

FIG. 7 shows an exemplary block diagram of security agent 114 that may include controller 202 and memory 204 coupled together via bus 212. Network interface 120 is shown in dotted lines because controller 202 may access network 102 via network interface 120 to communicate with other portions of security infrastructure 100. While FIG. 7 shows the above components in a hardware bus architecture format as an example, other hardware architectures may be used and the functions of security agent 114 may be divided differently among the components. These components may be constructed using FPGAs, PLAs, ASICs, etc. Additionally, security agent 114 may be partly or completely implemented in software as programs executed by one or more general or special purpose computers such as microprocessors, personal computers, servers, mainframes, etc.

Security agents 114 may perform automated analysis processes for all possible event-messages. Some of the security agents may process event-messages generated by monitor system 106 or other security agents while others take actions based on ticket-events generated by ticketing system 107. Thus, many instances of security agents 114 may be running in security processor 104 to process event-messages and ticket-events, which may include open, close and/or update of tickets, each addressing a different security issue.

As noted above, security agents 114 may be organized hierarchically where each of the security agents 114 may be tailored to analyze specific security issues that may arise. Thus, each of the security agents may subscribe to a very small subset of all possible event-messages and have specific logic to analyze the targeted security issue. High level security agents 114 may be created to track activities of multiple security agents 114 and recognize certain patterns of security issues so that multiple opened tickets may be associated with one security breach. However, for ease of understanding, the following discussion describes the function of all security agents 114 as a whole even though any particular security agent 114 may not perform all the functions described below, but performs functions that contribute to the overall functions of all the security agents 114. New security agents 114 may be designed to address newly identified security issues. Thus, security agents 114 may be created, updated, and/or deleted based on application needs that may be reflected by a number of security issues in the security infrastructure 100, for example.

As noted above, when an event incident is detected by monitor system 106, event-message formatter 110 formats the event received from monitor system 106 and generates an event-message for distribution by event-message distributor 112. The event-message may be stored in database 116 and transmitted/or to all subscribers.

When an event-message is received via network interface 120, controller 202 may first determine whether this event-message is related to a security issue already associated with an existing ticket. For example, as discussed below, a ticket may identify one or more of location, event type, event-database, etc. that may encompass a set of event-messages. Thus, when an event-message is received, controller 202 may search ticket repository 174 to identify existing open tickets that should be updated with the received event. As discussed below, updating a ticket activates the security agent 114 that initially opened the updated ticket to perform continued analysis of the updated ticket. Thus, if the received event-message is already encompassed by an existing ticket, then the existing ticket is updated and no further processing of the event-message is needed.

If an existing ticket that encompasses the received event-message is not found, the controller 202 may determine whether the event-message is associated with a legitimate activity by retrieving related information from memory 204 or other systems. For example, if a particular security agent 114 is responsible for authenticating and authorizing access to a high security door, valid access codes such as badge-IDs may be stored in memory 204 that is local to the particular security agent 114. Thus, when an event-message for accessing the door is received by the responsible security agent 114, controller 202 of the particular security agent 114 may efficiently compare the received security code (e.g., badge-ID) with the valid security code stored in memory 204 to authenticate the attempted access. If the access is authenticated and authorized, then controller 202 may grant access, log the access in security log file 178 and clear the event. However, if the security code was determined to be invalid, controller 202 may open a ticket having a preset priority, such as a lowest priority, record the attempted invalid access so that further processing may be performed in connection with the opened ticket.

Another example of legitimate testing may be when an event-message was generated based on an abnormal number of lost packets at a particular router or server. Controller 202 may retrieve a repair or maintenance schedule from memory 204 or other designated locations such as database 116 and determine whether the particular router or server identified in the event-message is identified in one of the legitimate activity lists. A legitimate activity may be a pre-scheduled maintenance activity, for example. The abnormal number of drop packets may be part of a legitimate maintenance process and thus the associated event-message may be cleared without further analysis. However, if the event-message is not determined to be associated with a legitimate process, then controller 202 may open a new ticket to initiate detailed tracking and processing of the event. The priority of the ticket may be set to a lowest level at the time the ticket is opened but the final priority may be set based on future analysis.

Figure 8:
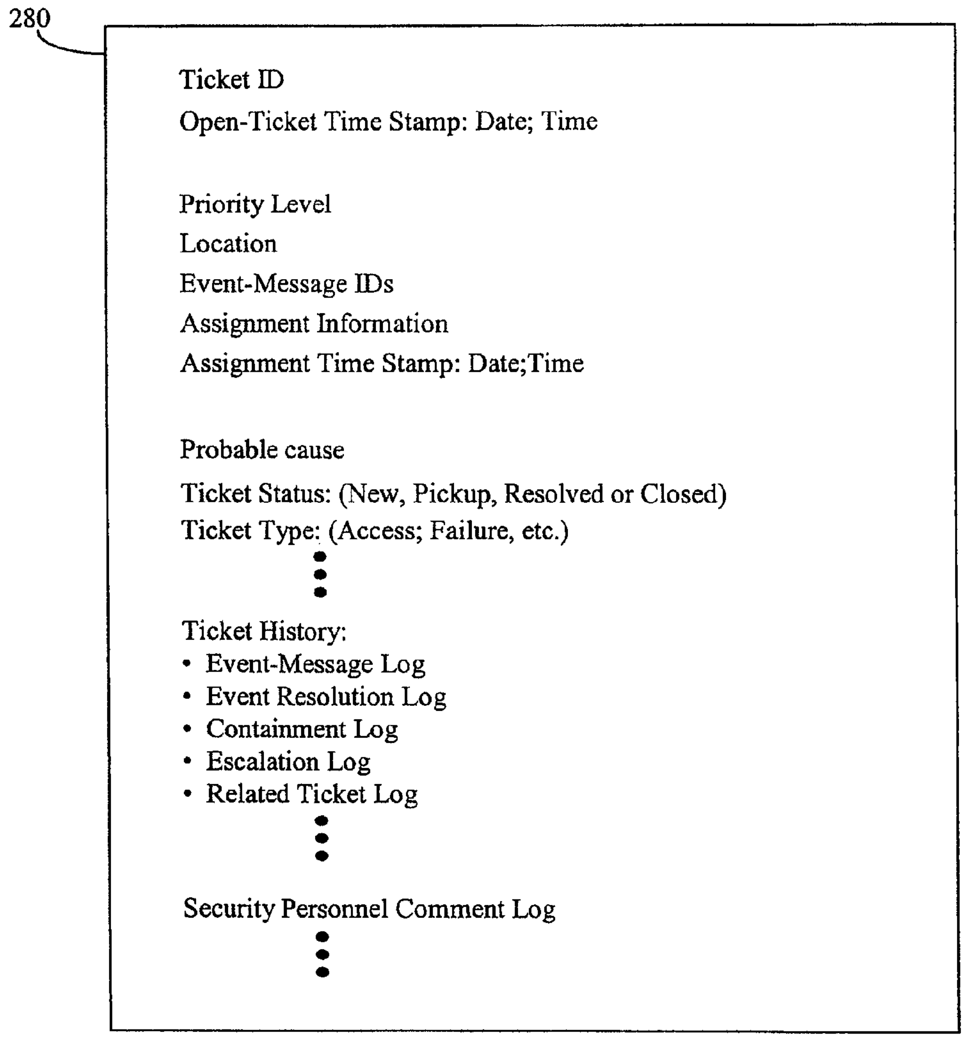
FIG. 8 shows an exemplary ticket.

FIG. 8 shows an exemplary ticket 280 that may store information such as parameters and various logs in connection with one or more event-messages. For example, ticket 280 may include ticket identification (ID) which may be used to retrieve the ticket from ticket repository stored in database 116. Ticket 280 may also included a ticket-open time stamp 12 that records the date and time when ticket 280 was opened; a priority level of ticket 280 that may be set based on the criticality of the security breach; location information of associated event-messages, one or more related event-message IDs that caused ticket 280 to be processed by one or more security agents 114; assignment information including one or more security personnel assigned to process ticket 280, an assignment time-stamp indicating the date and time when ticket 280 was assigned to the security personnel; a probable cause that indicates likely cause (e.g., dribble attack) of the security breach; a ticket status that indicates a disposition of ticket 280 whether the ticket is new and not-yet-assigned, whether an assigned security personnel has acknowledged receipt (i.e., pickup), whether security issues related to ticket 280 have been resolved, or whether ticket 280 has been closed; and a ticket type such as access, equipment failure, etc.

Ticket 280 may serve as a repository for related history in connection with the event-message such as various types of logs. For example, an event-message log may record history of event-messages that are considered to be interconnected with the security issue associated with ticket 280; an event resolution log may record a history of resolved security issues in connection with event ticket 280; a containment log may record various actions that were taken apparently to control the situation; an escalation log may record various escalation of past processing of ticket 280; a related ticket log may record other tickets that have been determined to be connected with ticket 280, etc. Further, ticket 280 may provide a place where security personnel may enter comments or provide pointers to special steps that may be taken under specified circumstances in connection with ticket 280. Thus, a ticket may be viewed as a general repository for a particular security issue that was opened in response to an event-message.

While the above discussion implies that security agents 114 directly manipulates contents of a ticket, security agents 114 may be relieved from the details of directly processing tickets by ticketing system 107. Ticketing system 107 may provide ticket-handling services such as opening a new ticket, updating a ticket, ensuring that security personnel are timely processing a ticket, etc. Thus, security agents 114 are provided a set of ticket related commands that may be associated with parameters for managing ticket contents. For example, ticketing system 107 may initialize a ticket based on information provided by a security agent 114 such as priority, location, probable cause, assigned security personnel, data to be logged, etc. based on security rules associated with the security agent 114.

Security personnel may also use ticketing system services to process tickets. For example, security personnel may command ticketing system 107 to enter information such as status, log data, comments, new assigned security personnel, etc. Thus, ticket contents may be managed by security agents 114 and/or security personnel via ticketing system 107. Ticketing system 107 produces a ticket event for every ticket change. As discussed below, ticket events trigger security agent analysis activity. Additionally, security agent 114 monitors security personnel activity with respect to tickets such as whether the assigned security personnel has picked up an assigned ticket. Ticketing system 107 provides feedback to security agents 114 of all manual activities related to tickets.

Returning to activities of controller 202 after opening a ticket, controller 202 may assign a priority level of a newly opened ticket. Preferably, a ticket is opened with a lowest priority until more information is collected to determine the security situation. For example, additional context may be needed to distinguish whether the event-message is due to unintentional mistake or intentional break in. Thus, controller 202 may collect event-messages associated with a portion of monitor system 106 monitoring one or more locations surrounding a location of the initial event-message for any event-messages associated with damages (e.g., equipment failure, power done, additional cyber attacks) that occurred around the same time, for example. If event-messages indicating damage is found or received a short time later, then controller 202 may conclude that a security breach is detected and all collected information may be logged in the newly created ticket.

If a security breach is declared, the controller 202 may attempt to contain the security breach. For example, if a DOS attack is detected, controller 202 may command the particular servers to redirect or deny the connection that have been identified as sources of DOS attacks. If a physical access security breach such as illegal door entry is detected by motion detectors, for example, controller 202 may command a lockdown procedure where access to doors surrounding a breached building area are denied for all security codes and appropriate security personnel is alerted to physically secure the affected areas.

In either case, controller 202 may perform impact assessment of the security breach and set the ticket priority based on the assessment. As discussed below, higher ticket priority may increase security personnel focus on the identified security issue so that more human resources may be devoted to resolving the related security issues, for example.

If no equipment failure or damage event-messages are received to support a security breach, controller 202 may retrieve via ticketing system 107 all tickets associated with the event-messages of the same type, location, etc. to analyze whether a long term pattern (e.g., 3 times in a week) may be recognized that indicate a possible dribble attack. If dribble and/or other types of attack patterns are detected, controller 202 may attempt to contain the attack similar to that discussed above. After the above discussed analysis (i.e., whether a recognized security breach, dribble attack, etc. and/or whether the recognized security issue is containable or not) is completed, controller 202 may update the ticket based on the analysis performed so far and then clear the event-message by deleting the event-message. However, the event-message remains in event-message repository 172 for future processing as needed.

Figure 9:
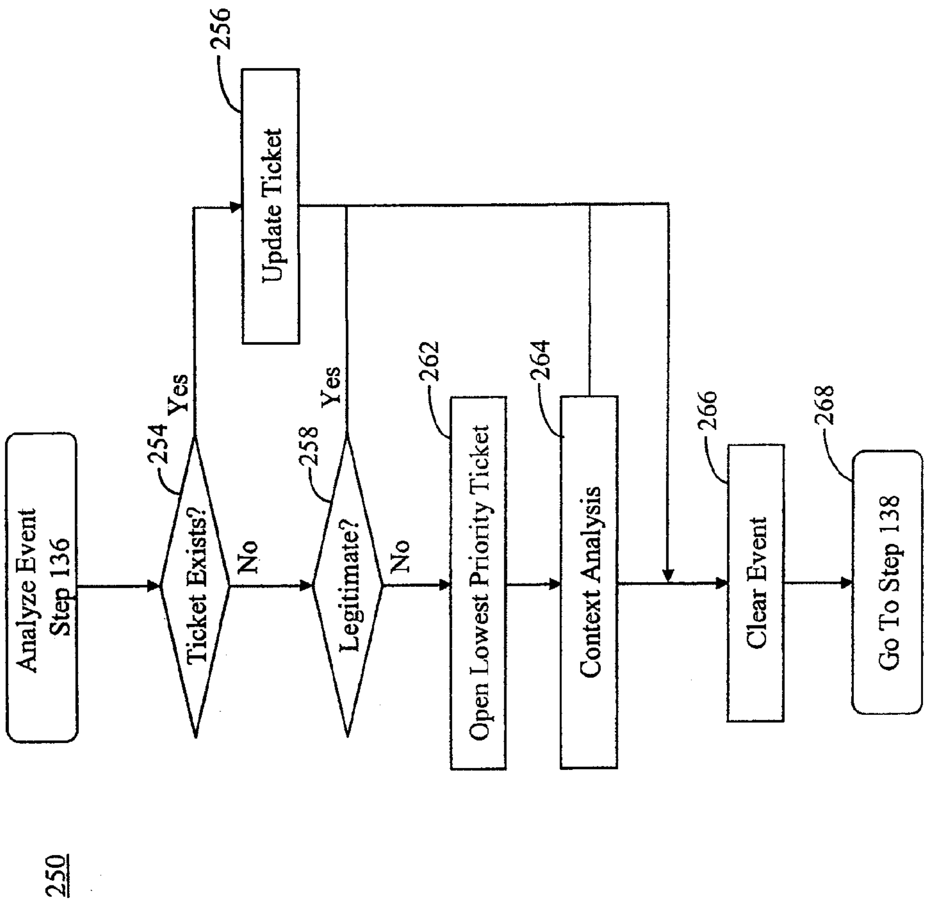
FIG. 9 shows a flowchart of an exemplary security agent event analysis process.

FIG. 9 shows a flowchart 250 of an exemplary process for the analyzed event step 136 shown in flowchart 130 of FIG. 6. In step 254, the process determines whether a ticket already exists that is associated with an event-message. If a ticket already exists, the process goes to step 256; otherwise, the process goes to step 258. In step 256, the process updates the ticket history and other parameters of the ticket as appropriate and goes to step 266. In step 258, the process determines whether the event is legitimate activity by checking information such as authentication/authorization or pre-scheduled maintenance activity, for example. If the event is legitimate, the process goes to step 266; otherwise, the process goes to step 262.

In step 262, the process opens a lowest priority ticket, for example, and goes to step 264. In step 264, the process performs context analysis and goes to step 266. In step 266 the process clears the event and goes to step 268 which returns to step 138 of FIG. 6.

Figure 10:
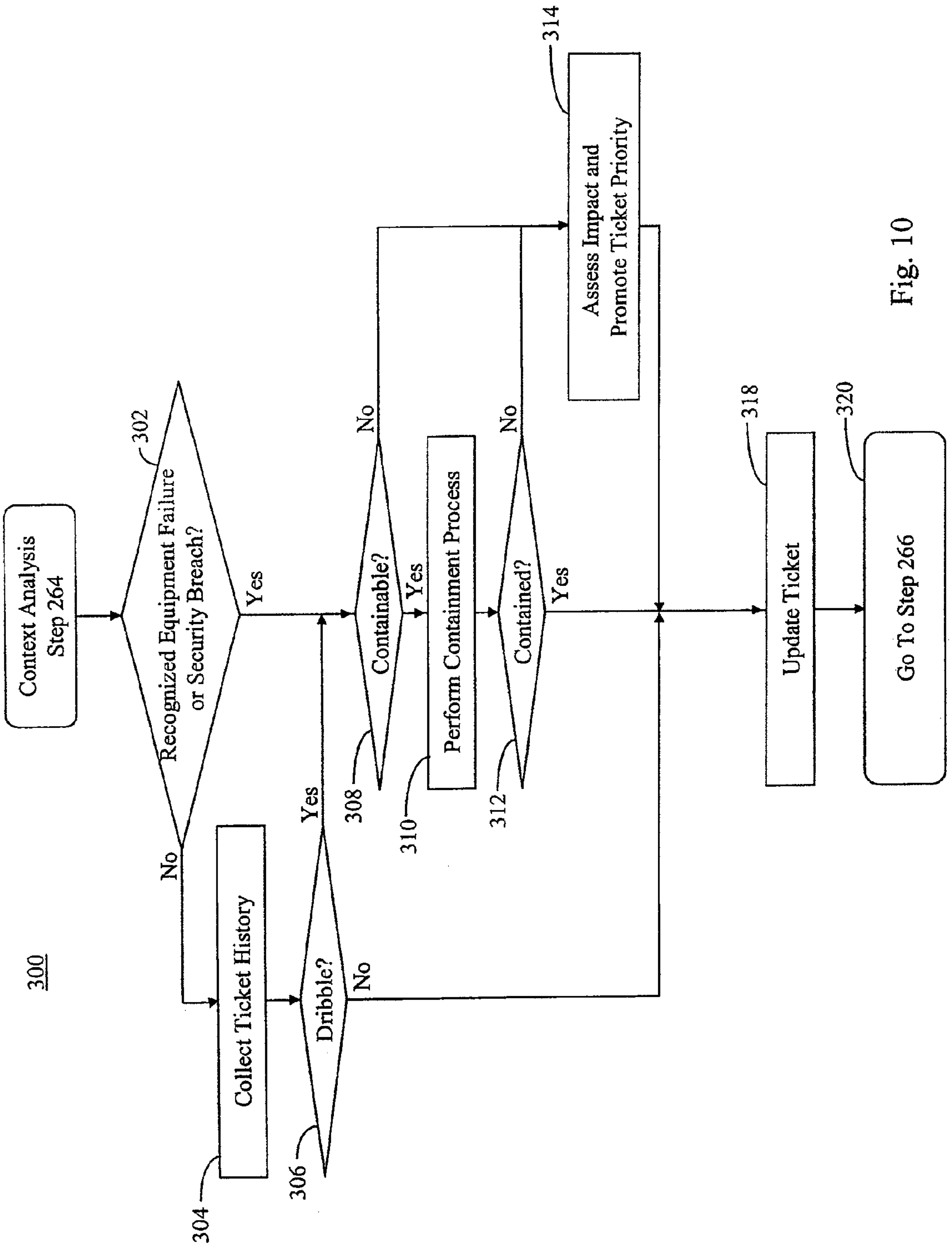
FIG. 10 shows a flowchart of an exemplary process for security agent ticket analysis.

FIG. 10 shows a flowchart 300 of a process that performs the context analysis step 264 shown in FIG. 9. In step 302, the process determines whether related event-messages that may indicate damage such as an equipment failure have been received around the same time and same location/source. If the damage indicating event-messages have been received and a security breach pattern is recognized, the process goes to step 308; otherwise, the process goes to step 304. In step 304, the process collects all tickets related to this location, for example, and goes to step 306. In step 306, the process determines whether a dribble attack pattern may be recognized. If a dribble attack is recognized, the process goes to step 308; otherwise, the process goes to step 316.

In step 308, the process determines whether the security issue identified in step 302 is containable. If containable, the process goes to step 310; otherwise, the process goes to 314. In step 310, the process performs a prescribed containment process (e.g., lockdown of breached area, deny access from a server that owns an identified source address, etc.) and goes to step 312. In step 312, the process verifies whether the containment process was successful. If the containment process was successful, the process goes to step 316; otherwise, the process goes to step 314. In step 314, the process assesses the impact of the security issue and sets the ticket priority (e.g., security breach has priority 1 and 2 while dribble attack has priority 3) and goes to step 316. In step 318, the process updates ticket information by adding to the ticket history, for example, and goes to step 320 which goes to step 266 of flowchart 250 shown in FIG. 9.

Figure 11:
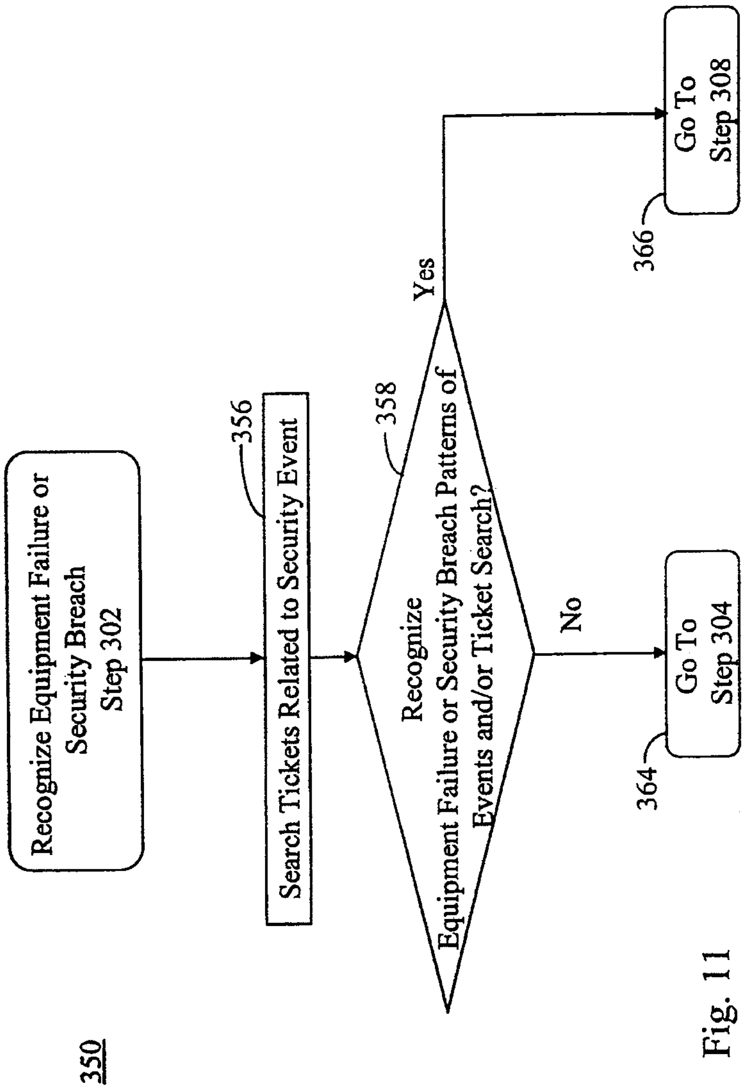
FIG. 11 shows a flowchart of an exemplary process for security agent failure/breach recognition.

FIG. 11 shows a flowchart 350 of an exemplary process for recognizing equipment failure or security breach step 302 of flowchart 300 shown in FIG. 10. In step 356, all tickets related to the same location as the current event-message and created in the past few months are collected, for example, and the process goes to step 358. In step 358, various patterns are applied to information contained in the collected tickets. If the information match one or more patterns corresponding to equipment failure or a security breach is recognized, the process goes to step 366 which in turn goes to step 308 of flowchart 300 shown in FIG. 10; otherwise, the process goes to step 364 which in turn goes to step 304 of flowchart 300 shown in FIG. 10.

Figure 12:
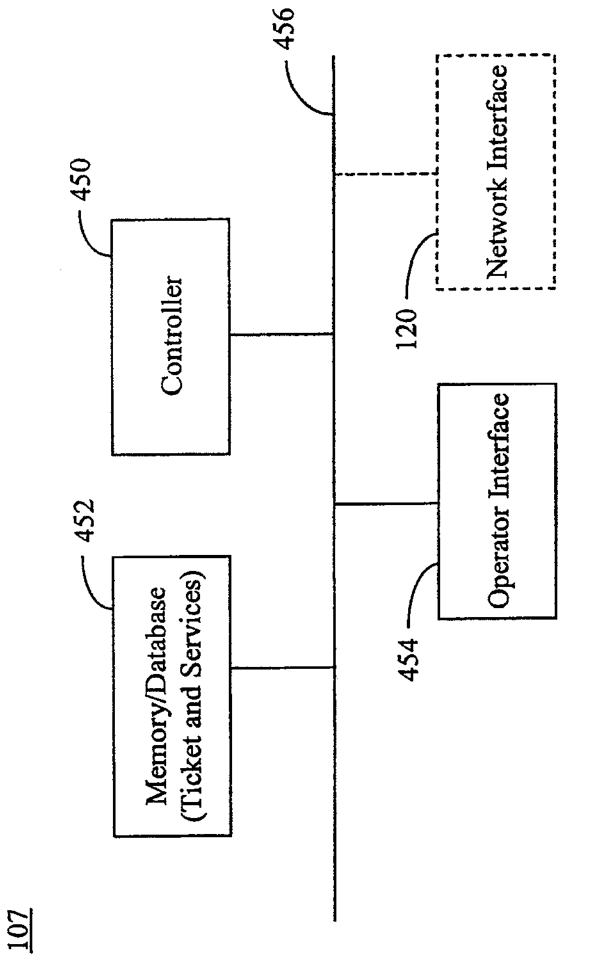
FIG. 12 shows an exemplary block diagram of a ticketing system.

FIG. 12 shows a block diagram of ticketing system 107 shown in FIG. 2. Ticketing system 107 may include a controller 450, a memory/database 452 that may store tickets and services (e.g., open, update or close ticket), for example, and operator interface 454. All of these components may be coupled together via a bus 456. FIG. 12 also shows network interface 120 in dotted lines that may be accessed by controller 450 and operator interface 454. As discussed in connection with previous hardware block diagrams, while FIG. 12 shows the components in a hardware bus architecture format, other architectures may be used, for example. These components may be constructed using FPGAs, PLAs, ASICs, etc. Additionally, ticketing system 107 may be implemented partly or completely using software such as programs that are executed by one or more general or special computes such as personal computers, servers, mainframes, etc.

Controller 450 manages tickets that are opened, updated and closed by security agents 114 in connection to analysis of security issues. When any ticket is changed (e.g., created, updated, closed), controller 450 generates a ticket-event to alert security agents 114, security personnel and/or management personnel via network interface 120, for example.

When ticket event-messages are received, the security agent 114 may notify personnel (e.g., management, security guard, police) through email or pager, for example. FIG. 13 shows an exemplary notification list in table format. Rows 462 represent the personnel that has subscribed to the ticket and column 464 indicates one or more criteria that specify the conditions when the subscriber should be notified, and columns 466 indicate the contact information for each subscriber such as email address, telephone number, etc. For example, John Doe desires to be notified when the ticket status is new or closed and when the ticket priority is between 1 and 3 inclusively. John Doe's contact information is an email address and a pager number.

More complex notification criteria may be provided such as directing the notification message, such as an alert, to different contact destinations for different ticket conditions. For example, the criteria may specify contacting using email if the ticket status is set to close, but contacting using pager if priority is 1 or the ticket status is new. The security agent 114 may determine if any of the criteria is met, and if met, transmit alert messages to personnel via network interface 120 by sending e-mail, pages, facsimile, telephone call, etc. as may be specified by the criteria and associated contact information.

If the ticket-event is associated with a ticket having a lowest priority, security agent 114 may close the ticket without further activities. Closing a ticket may not be identical to deleting a ticket. Closing a ticket may involve security agent 114 setting a timer in connection with the ticket and upon expiration of the timer, the ticket may be placed in long term storage. The timer may have values in terms of days such as 120 days, for example. If the ticket has a priority higher than the lowest priority, security agent 114 may determine whether the ticket is a new ticket. If the ticket is not a new ticket, it may further determine whether the ticket status indicates that the ticket has been resolved.

A ticket is resolved when the related security issue has been satisfactorily handled by the assigned security personnel. For example, the assigned security personnel may change the status of the ticket to resolve via operator interface 454. If the ticket has been resolved, security agent 114 may close the ticket and clear the ticket event-message. Otherwise, if the ticket-status indicates that the ticket has not been resolved, it may clear the ticket-event.

If the ticket is a new ticket, security agent 114 may send the ticket to the assigned security personnel to resolve the issue. Particular security personnel may be assigned to tickets based on assigned responsibility, expertise and location. Security agent 114 may make any required decisions and update the ticket assignment to send an alert message to the assigned security personnel through operator interface 454.

After a delay of a predetermined amount of time, security agent 114 may determine whether the ticket has been picked up based on whether a pickup ticket-event is received. If the pickup ticket-event is not received, then security agent 114 may escalate the ticket by sending alert messages via email or pager to higher levels of management so that the lack of attention may be corrected.

After the ticket has been picked up by the assigned security personnel, security agent 114 may monitor the progress of the ticket processing. For example, a timer may be set within which the assigned security personnel must resolve or properly dispose of the ticket. If after a predetermined time has elapsed and an expected ticket-event is not receive to indicate that the ticket is resolved, then security agent 114 may again escalate to even higher levels management. If the ticket is resolved within the allocated time, security agent 114 may clear the ticket-event.

Figure 14:
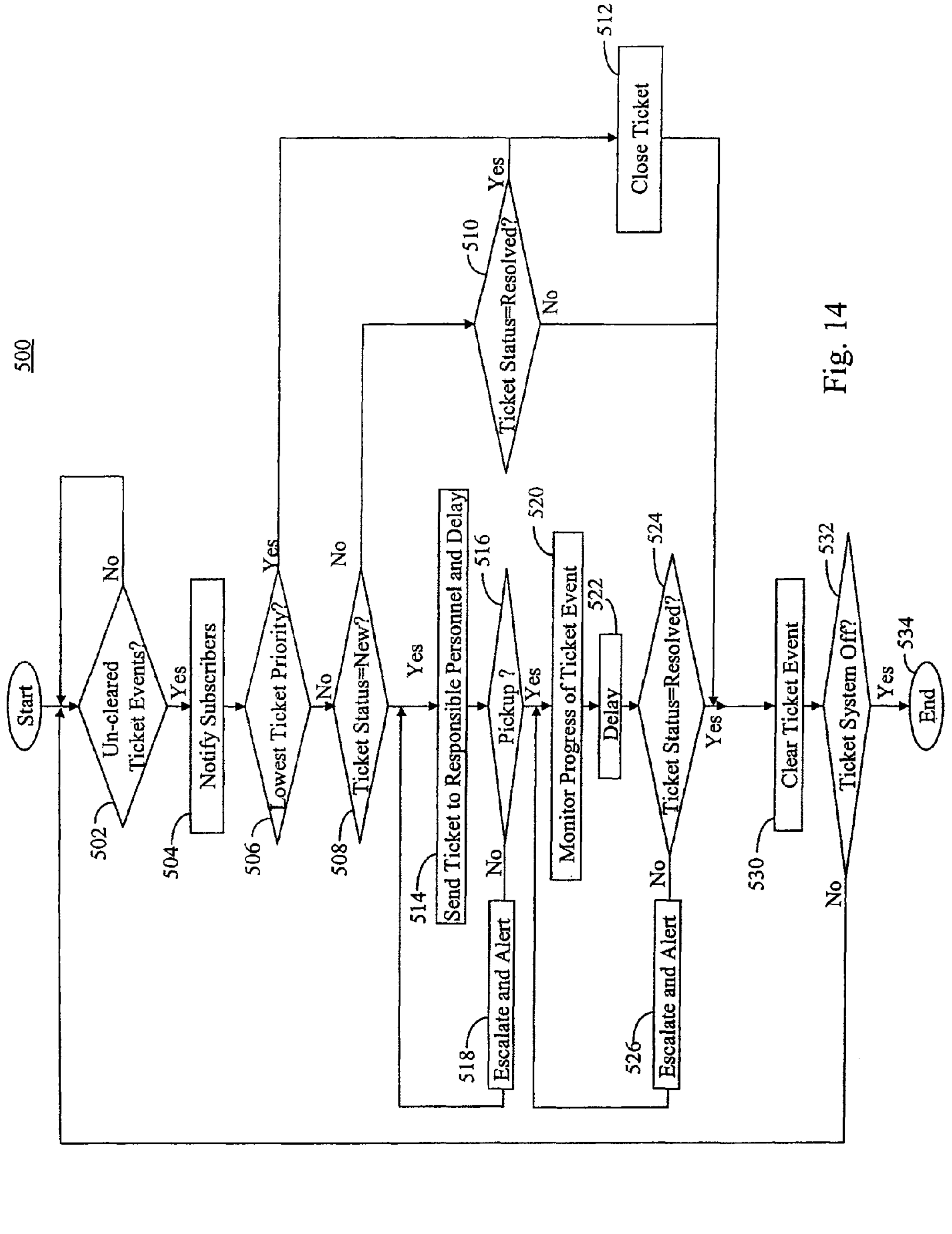
FIG. 14 shows a flowchart of an exemplary ticketing system process.

FIG. 14 shows a flowchart 500 of an exemplary security agent ticket-event process. In step 502, the process determines whether a ticket event has occurred. If a ticket-event has occurred, the process goes to step 504; otherwise, the process returns to step 502. In step 504, the process notifies subscribers to the ticket-event and goes to step 506. In step 506, the process determines whether the ticket has a lowest priority. If the ticket has lowest priority, the process goes to step 512; otherwise, the process goes to step 508. In step 508, the process determines whether the ticket is a new ticket. If the ticket is not a new ticket, the process goes to step 510; otherwise, the process goes to step 514. In step 510, the process determines whether the ticket has been resolved. If the ticket has been resolved, the process goes to step 512; otherwise, the process goes to step 530. In step 512, the process closes the ticket and goes to step 530.

In step 514, the process sends the ticket to responsible personnel such as assigned security personnel or management personnel and waits a predetermined amount of delay time. After the delay time, the process goes to step 516. In step 516, the process determines whether the ticket has been picked up by the assigned security personnel to the ticket, for example. If the ticket has been picked up by the assigned security personnel, the process goes to step 520; if the ticket has not been picked up, the process goes to step 518. In step 518, the process escalates the ticket by alerting additional personnel based on subscription criteria such as the escalation event, and returns to step 514.

In step 520, the process monitors the progress of the ticket-event and goes to step 522. In step 522, the process delays for a predetermined amount of time and goes to step 524. In step 524, the process determines whether the ticket has been resolved. If the ticket has been resolved, the process goes to step 530; otherwise, the process goes to step 526. In step 526, the process escalates the ticket by alerting personnel that should be alerted based on subscription criteria, escalation event and the process returns to step 520. In step 530, the process clears the ticket-event and goes to step 532. In step 532, the process determines whether ticket system 107 has been turned off or otherwise disabled. If the ticket tracker has been turned off, the process goes to step 534 and ends; otherwise, the process returns to step 502.

While the invention has been described in conjunction with exemplary embodiments, these embodiments should be viewed as illustrative, not limiting. Various modifications, substitutes or the like are possible within the spirit and scope of the invention.

What is claimed is:

1. A method for operating a security infrastructure, comprising:

receiving, via a processor, data in response to a first event in the security infrastructure;

formatting, via the processor, the data into an event-message having a common format within the security infrastructure; and distributing, via the processor, the event-message to a processing entity of a plurality processing entities of the security infrastructure, wherein the processing entity is assigned to analyze a topic of the event-message, wherein at least two of the plurality processing entities are assigned to a different security issue, wherein each of the processing entities comprises a computing device and comprises a security agent that uses an inference engine for analyzing a security issue, wherein the analyzing the security issue comprises identifying a pattern in a plurality of event-messages.

2. The method of claim 1, further comprising:

searching a ticket repository for an associated ticket, wherein the associated ticked is a ticket that is associated with the event-message when the event-message corresponds to the security issue; and updating information in the associated ticket based on the event-message.

3. The method of claim 2, further comprising:

opening a new ticket based on the event-message when the associated ticket is not found in the ticket repository; and initializing a parameter of the new ticket based on the security issue.

4. The method of claim 3, further comprising:

collecting further events occurring after the first event.

5. The method of claim 4, further comprising:

identifying a containment action when the security issue is identified in analyzing the security issue; and performing the containment action, when the containment action is identified.

6. The method of claim 5, further comprising:

assessing an impact of the first event when no containment action is identified; and updating information in the ticket associated with the event-message.

7. The method of claim 4, further comprising:

analyzing a ticket history of the associated ticket to identify the pattern, wherein the pattern is associated with a dribble attack;

identifying a containment action when the dribble attack is identified in the analyzing of the ticket history;

performing the containment action that is identified; and updating information in the associated ticket.

8. The method of claim 3, further comprising:

notifying first personnel when the new ticket is opened;

notifying the first personnel when information of the associated ticket is updated;

closing the associated ticket when the associated ticket has a lowest priority; and closing the new ticket when the new ticket has a lowest priority.

9. The method of claim 8, further comprising:

sending the new ticket to a security personnel based on the parameter of the new ticket; and monitoring to confirm a receipt of the new ticket by the security personnel.

10. The method of claim 9, further comprising:

escalating the new ticket by alerting other personnel until the receipt of the new ticket is confirmed; and monitoring the new ticket until a status of the new ticket indicates that the new ticket is resolved.

11. The method of claim 10, wherein the escalating and the monitoring comprise:

a. delaying a predetermined amount of time, wherein the predetermined amount of time is for alerting the other personnel when the new ticket is not received;

b. checking if the security personnel has received the new ticket;

c. alerting the other personnel when the new ticket is not received by the security personnel; and d. repeating steps a-c until the new ticket is received by the security personnel.

12. The method of claim 11, wherein the predetermined amount of time is changed for each iteration; and alerting the other personnel comprises alerting different ones of the other personnel for each iteration.

13. The method of claim 10, wherein the escalating and the monitoring further comprise:

a. delaying a predetermined amount of time, wherein the predetermined amount of time is for alerting the other personnel when the new ticket is not resolved;

b. checking if the new ticket has been resolved;

c. alerting the other personnel when the new ticket is not resolved; and d. repeating steps a-c until the new ticket is resolved.

14. The method of claim 13, wherein the predetermined amount of time is changed for each iteration; and alerting the other personnel comprises alerting different ones of the other personnel for each iteration.

15. A computer readable medium storing a plurality of instructions which, when executed by a processor, cause the processor to perform operations for a security infrastructure, the operations comprising:

receiving data in response to a first event in the security infrastructure;

formatting the data into an event-message having a common format within the security infrastructure; and distributing the event-message to a processing entity of a plurality processing entities of the security infrastructure, wherein the processing entity is assigned to analyze a topic of the event-message, wherein at least two of the plurality processing entities are assigned to a different security issue, wherein each of the processing entities comprises a computing device and comprises a security agent that uses an inference engine for analyzing a security issue, wherein the analyzing the security issue comprises identifying a pattern in a plurality of event-messages.

16. The computer readable medium of claim 15, further comprising:

searching a ticket repository for an associated ticket, wherein the associated ticket is a ticket that is associated with the event-message when the event-message corresponds to the security issue;

updating information in the associated ticket based on the event-message;

opening a new ticket based on the event-message when the associated ticket is not found in the ticket repository; and initializing a parameter of the new ticket based on the security issue.

17. The computer readable medium of claim 16, further comprising:

collecting further events occurring after the first event;

analyzing the first event and the further events to identify the pattern, wherein the pattern is associated with a known security issue;

identifying a containment action when the known security issue is identified in the analyzing the first event;

performing the containment action, when the containment action is identified;

assessing an impact of the first event when no containment action is identified; and updating information in the ticket associated with the event-message.

18. The computer readable medium of claim 17, further comprising:

analyzing a ticket history of the associated ticket to identify the pattern, wherein the pattern is associated with a dribble attack;

identifying a containment action when the dribble attack is identified in the analyzing of the ticket history;

performing the containment action that is identified; and updating information in the associated ticket.

19. The computer readable medium of claim 17, further comprising:

notifying first personnel when the new ticket is opened;

notifying the first personnel when information of the associated ticket is updated;

closing the associated ticket when the associated ticket has a lowest priority;

closing the new ticket when the new ticket has a lowest priority;

sending the new ticket to a security personnel based on the parameter of the new ticket;

monitoring to confirm a receipt of the new ticket by the security personnel;

escalating the new ticket by alerting other personnel until the receipt of the new ticket is confirmed; and monitoring the new ticket until a status of the new ticket indicates that the new ticket is resolved.

20. A security infrastructure, comprising:

a processor; and a computer readable medium storing a plurality of instructions which, when executed by the processor, cause the processor to perform operations, the operations comprising:

receiving data in response to a first event in the security infrastructure;

formatting the data into an event-message having a common format within the security infrastructure; and distributing the event-message to a processing entity of a plurality processing entities of the security infrastructure, wherein the processing entity is assigned to analyze a topic of the event-message, wherein at least two of the plurality processing entities are assigned to a different security issue, wherein each of the processing entities comprises a computing device and comprises a security agent that uses an inference engine for analyzing a security issue, wherein the analyzing the security issue comprises identifying a pattern in a plurality of event-messages.

* * * * *